UNITED STATES PATENT OFFICE.

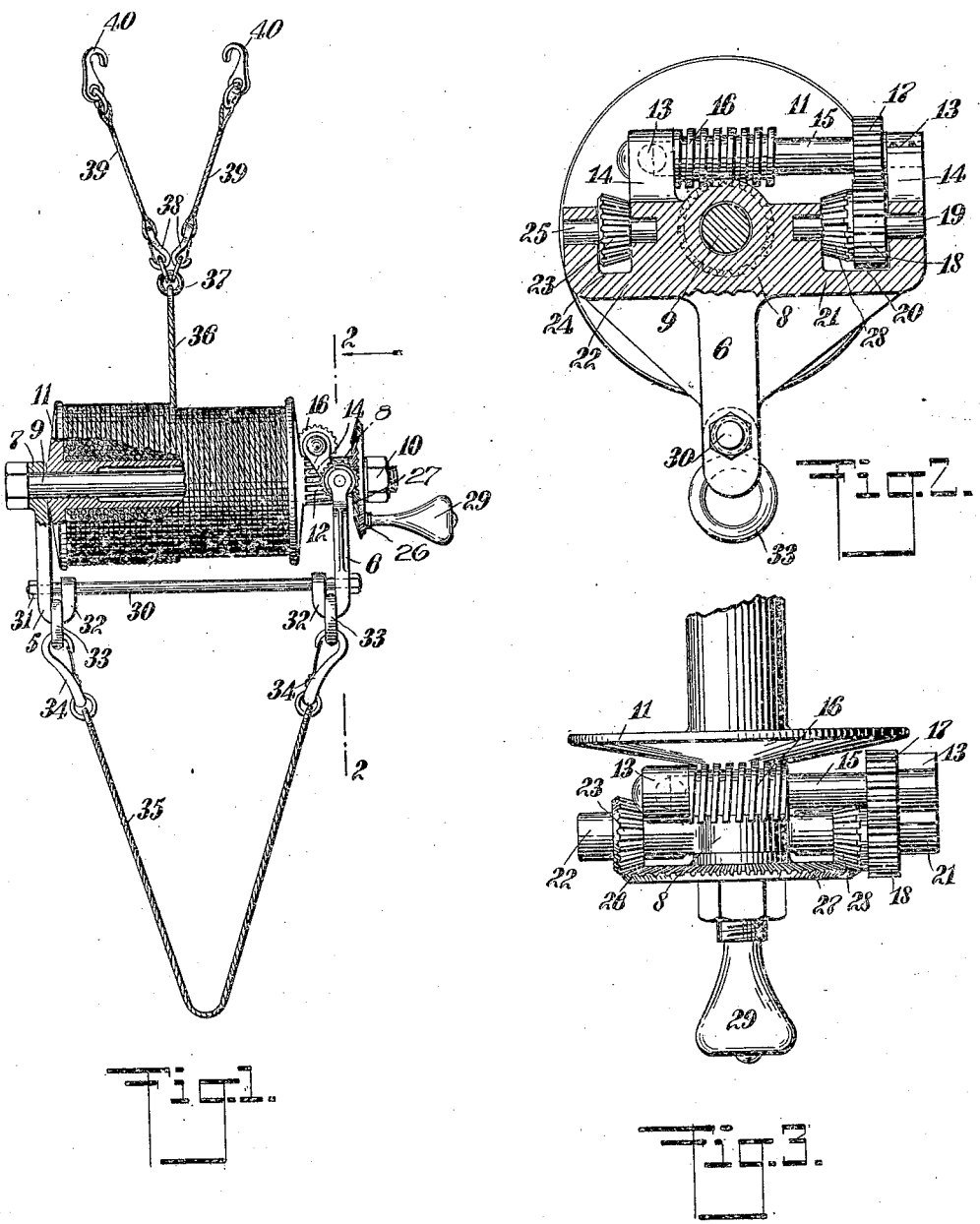

JOHN WILLIAM THOMPSON, OF HINCHCLIFF, MISSISSIPPI.

FIRE-ESCAPE.

959,404.  Specification of Letters Patent. Patented May 24, 1910.

Application filed September 1, 1909. Serial No. 515,577.

*To all whom it may concern:*

Be it known that I, JOHN WILLIAM THOMPSON, a citizen of the United States, and a resident of Hinchcliff, in the county of Quitman and State of Mississippi, have invented a new and Improved Fire-Escape, of which the following is a full, clear, and exact description.

My invention relates to fire escapes, and it has for its object to provide one with a drum, a worm wheel secured to a shaft journaled in the frame, a second shaft being provided for a gear wheel, a worm, the worm engaging the worm wheel, and the gear wheel on a third shaft, which has also a bevel gear which meshes with the bevel gear on a hand wheel, by which the mechanism is operated.

Means are provided for attaching fasteners to the frame of the device and a cable is wound on the drum.

Another object of the invention is to so construct and assemble the parts that they may be taken apart, permitting them to be packed readily in a small compass, as in a bag.

Still other objects of the invention will appear in the following complete description.

In this specification I will describe the preferred form of my invention, it being understood that the scope of the invention is defined in the appended claims.

Reference is to be had to the accompanying drawings, which form part of this specification, in which similar characters of reference indicate corresponding parts in all the views.

Figure 1 is an elevation showing the device with part of the drum broken away; Fig. 2 is a sectional view on the line 2—2 of Fig. 1; and Fig. 3 is a plan view of the gearing.

By referring to the drawings it will be seen that two frame members 5 and 6 are provided, the frame member 5 having a bearing 7, and the frame member 6 having a bearing 8 in which a bolt 9, serving as a shaft, is journaled. The bolt 9 has a nut 10 by which it is held in place in its bearing.

On the bolt or shaft 9 is secured a drum 11 and a worm wheel 12, the bearing 8 being disposed at the outer side of the worm wheel 12, and the bearing 7 being disposed at the outer side of the drum 11, the drum 11 and the worm wheel 12 being disposed one at the side of the other.

In bearings 13 in lugs 14 secured to the frame member 6 is journaled a shaft 15 having a worm 16 and a gear wheel 17, the worm 16 engaging the worm wheel 12 and the gear wheel 17 being engaged by a gear wheel 18 mounted on a shaft 19 disposed in a slot 20 in a lateral projection 21 of the frame member 6, the shaft 19 being journaled in bearings in the said lateral projection 21 of the frame member 6. Opposite the lateral projection 21 there is another lateral projection 22 forming a part of a frame member 6, a bevel gear wheel 23 being disposed in a slot 24 in the said lateral projection 22, the bevel gear wheel 23 being mounted on an axle 25 journaled in bearings in the said lateral projection 22.

Mounted to rotate on the bolt or shaft 9, there is a hand wheel 26 having a bevel gearing 27, the bevel gear wheels 23 and 28, the latter being mounted on the shaft 19 alongside of the gear wheel 18, being adapted to engage the bevel gear 27 on the hand wheel 26.

A handle 29 is secured to the hand wheel 26 near its periphery.

If desired, ball bearings may be provided between the bearing 8 and the worm wheel 12, and also between the drum 11 and the bearing 7 in the frame member 5.

A bolt 30 is disposed in orifices in the frame members 5 and 6, a nut 31 being provided to hold the bolt 30 in position.

The lower terminals of the frame members 5 and 6 have hooks 32 on which are disposed rings 33, which are engaged by snap hooks 34 in which is secured a rope or seat 35. A cable 36 is wound on the drum 11, the cable 36 having a ring 37 at its terminals, which is engaged by snap hooks 38 secured to ropes 39, each of which has a hook 40 which may be secured to the window frame or sill. As will readily be understood, the hooks 34 may be freed from the rings 33 and the hooks 38 may be freed from the rings 37 so that the rope or seat 35 may be attached to the cable 36, and the ropes 39 may be secured to the rings 33 respectively.

In using my invention the hooks 40 are secured to a window frame or sill and the person to be conveyed to the ground seats himself in the rope or seat 35, and by rotating the hand wheel 26 by the handle 29, the gearing rotates the bolt or shaft 9, thereby rotating the drum 11 and unwinding the cable 36 therefrom. In this way the person occupying the seat is able to unwind the cable 36 and permit the frame to which the seat is secured, to travel toward the ground. If at any time it is desired to lower a number of people to the ground, the rope or seat 35 may be removed from the rings 33 and be secured to the ring 37, and the ropes 39 may be secured to the rings 33 by means of the snap hooks 38. When the members have been arranged as has been described, a person may be seated in the rope or seat 35, and the operator at the window to which the hooks 40 are fastened, is able by means of rotating the hand wheel 26 by its handle 29 to unwind the cable 36, thereby permitting the rope or seat 35, which is secured to the rings 37, to be conveyed to the ground. It will be understood that at any time the operator may check the unwinding of the cable 36 from the drum 11 by holding the handle stationary. It is therefore impossible for the rope or seat 35 to descend rapidly contrary to the will of the person seated therein.

Having thus described my invention, I claim as new and desire to secure by Letters Patent:

1. In a fire escape, a frame having orifices, a shaft disposed in the orifices in the frame, a drum and a worm wheel on the shaft, a second shaft journaled in the frame, a worm and a gear wheel on the second-mentioned shaft, the worm being adapted for operating the worm wheel, a third shaft, two gear wheels on the third shaft, one of the said two gear wheels meshing with the gear wheel on the second-mentioned shaft, and a hand wheel having a gear meshing with the other of the said two gear wheels on the third shaft, the hand wheel being mounted loosely on the first-mentioned shaft.

2. In a fire escape, a frame having two depending members, a shaft journaled in bearings in the frame, a drum and a worm wheel on the shaft, a second shaft journaled in the frame at right angles to the first shaft, a worm and a gear wheel on the second shaft, the worm being adapted to engage the worm wheel, a third shaft journaled in bearings in the frame substantially parallel with the second shaft, the third shaft having two gear wheels, one of which is beveled, the other of the gear wheels engaging the gear wheel on the second shaft, a hand wheel having a bevel gear meshing with the first-mentioned bevel gear mounted loosely on the first-mentioned shaft, and means on the depending members of the frame for attaching a support.

3. In a fire escape, a frame, a shaft in bearings in the frame, a drum and a worm wheel on the shaft, a second shaft journaled in the frame, a worm and a gear wheel on the second-mentioned shaft, the worm being adapted for operating the worm wheel, a third shaft, two gear wheels on the third shaft, one of the said two gear wheels meshing with the gear wheel on the second-mentioned shaft, the gear of the other of the two said gear wheels being beveled, a hand wheel having a beveled gear meshing with the first-mentioned bevel gear, mounted loosely on the first-mentioned shaft, and another bevel gear wheel mounted to rotate on the frame, the last-mentioned bevel gear wheel acting as an idler engaging the gear on the hand wheel.

4. In a fire escape, two frame members, a bolt serving as a shaft journaled in the frame members and being readily removable therefrom, a drum and a worm wheel on the shaft, two additional bearings in one of the frame members, a shaft journaled in one of the said additional bearings, the shaft having a worm and a gear wheel, the worm engaging the worm wheel on the bolt, another shaft journaled in the second of the two additional bearings, a gear wheel on the said shaft engaging the gear wheel on the other shaft journaled in the first of the two additional bearings, a bevel gear wheel on the shaft journaled in the second of the said two additional bearings, and a hand wheel with bevel teeth mounted to rotate on the bolt, the bevel gear teeth on the hand wheel engaging the said bevel gear wheel.

In testimony whereof I have signed my name to this specification in the presence of two subscribing witnesses.

JOHN WILLIAM THOMPSON.

Witnesses:
J. J. ALDER,
GEO. H. THOMPSON.